Jan. 28, 1958  R. E. BATEMAN  2,821,044
FISH LURE
Filed Oct. 5, 1953
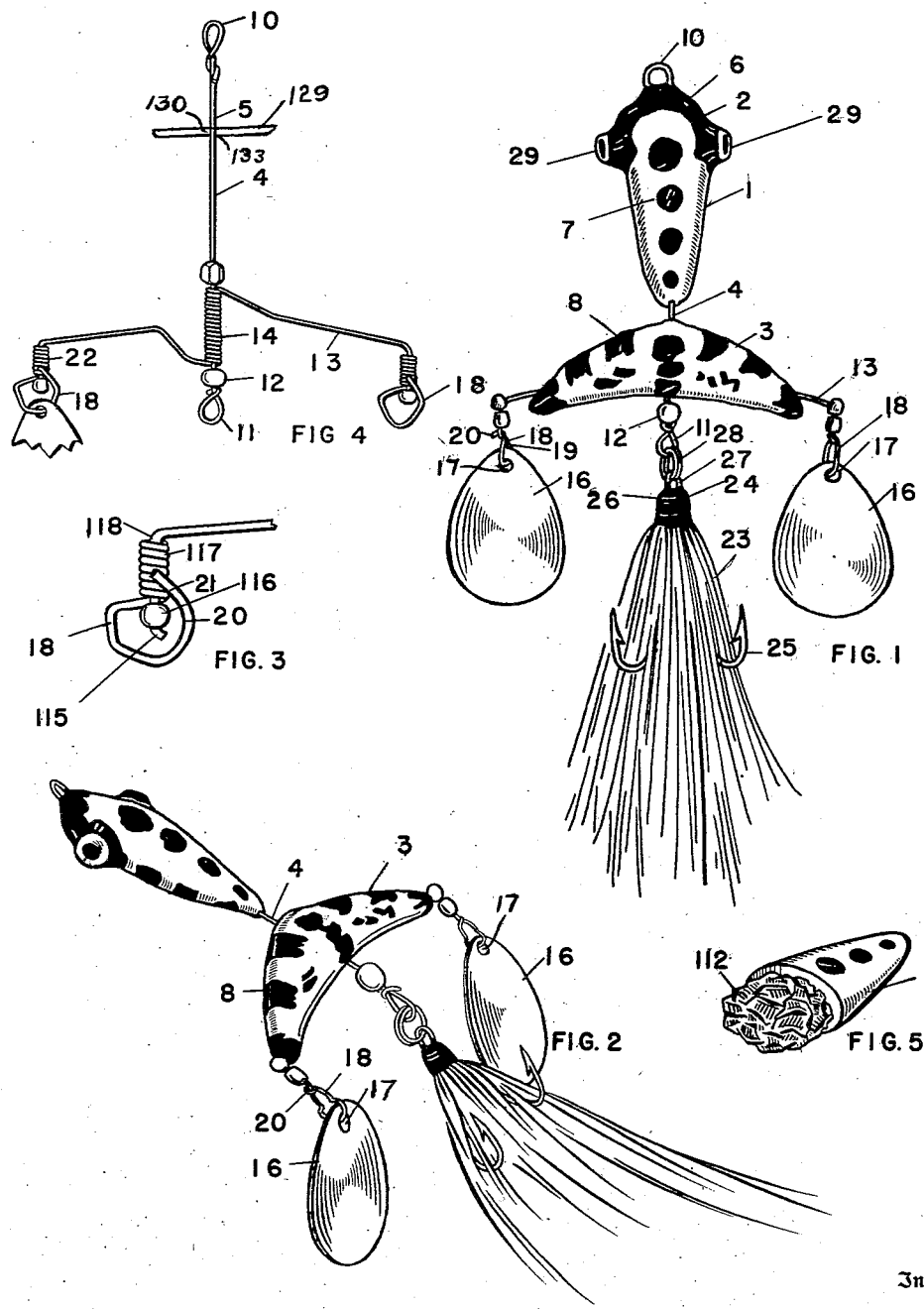
Inventor
ROBERT E. BATEMAN
By Charles L. Lovercheck
Attorney

United States Patent Office 2,821,044
Patented Jan. 28, 1958

2,821,044

FISH LURE

Robert E. Bateman, North Girard, Pa.

Application October 5, 1953, Serial No. 384,148

3 Claims. (Cl. 43—42.16)

This invention relates to fish lures and more particularly to artificial fish lures imitating a natural frog, both in appearance and movement.

To my knowledge, there has never been provided a fish lure which would imitate the appearance and movements of a frog in the water unless the fish line on which the lure was attached was maneuvered by a skilled fisherman. After casting, it was necessary for the fisherman to reel the lure in, giving rapid jerks on his line to give the lure the desired action simulating the movements of a frog.

It is, accordingly, an object of my invention to overcome the above and other disadvantages and defects in prior fish lures and more particularly it is an object of my invention to provide a fish lure which will be simple in construction, economical in manufacture, and effective and efficient in use.

Another object of my invention is to provide a fish lure which will have the appearance as nearly as possible of a natural frog, both in the manner of action and in its appearance.

Another object of my invention is to provide a body on a fish lure made of transparent plastic.

Another object of the invention is to provide a novel type of legs for a simulated frog fish lure.

Another object of my invention is to provide an imitation frog fish lure wherein the body of the frog is lighter than the remainder, causing it to float with its head up.

Another object of my invention is to provide a novel removable connection for spinners in a fish lure.

With the above and other objects in view, the present invention consists of the combination and arrangement of parts hereinafter more fully described, illustrated in the accompanying drawing, and more particularly pointed out in the appended claims, it being understood that changes may be made in the form, size, proportions, and minor details of construction without departing from the spirit or sacrificing any of the advantages of the invention.

In the drawing:

Fig. 1 is a view of a fishing lure according to my invention;

Fig. 2 is another view of the fish lure shown in Fig. 1;

Fig. 3 is an enlarged detailed view of a spinner supporting snap number;

Fig. 4 shows a specific detail of the framework for the fish lure shown in Figs. 1 and 2; and Fig. 5 shows another embodiment of a fish lure showing the foil inside the body thereof.

Now with more specific reference to the drawing, I show a fish lure 1 having a body portion 2 and legs 3 made on a framework 4 of wire material or the like. The body portion 2 is molded of plastic and the leg portions 3 are also molded of plastic with spots 7 and 8 painted thereon.

The frame 4 is made up of a main rod portion 5 having a line receiving eye 10 at one end thereof and a hook receiving eye 11 at the other end thereof. A bead 12 is disposed at the rear end thereof and the leg supporting frame wires 13 are loosely twisted in spiral form at 14 to surround the rod 5. Each end of the leg frames 13 terminates in a hook 115 which is threaded through the bead 116 and has the snap member 18 twisted at 117 to pivot around the end 118 (see Fig. 3). The spinners 16 have holes 17 therein to receive the removable snap members 18 which are formed by downwardly extending hole engaging member 19 and a hook member 20 which extends back over the main part of the removable members 18. The removable snap members 18 have the end 21 bent over to pivotally secure the removable members 18 in the eyes 10 and 11 in each end of the leg frames 13. The bucktail of hairs 23 is secured at 24 to the hook 25 by means of wrapping with thread at 26 and may, further, be dipped at one end thereof in plastic. The hook 25 has eyes 27 which engage the ring 28 which is in turn passed through the eye 11 at the rear end of the frame 4.

The rear leg 3 of plastic material is molded over the rear leg frame 13 and the body 2 is molded of plastic over the main rod frame 4 and the bulging eyes 29 are attached to a wire 129 which is attached to rod 5 by soldering at 130 and embedded in the plastic during the molding process.

During use, the fish lure made according to the disclosure shown in Figs. 1 and 2 will behave in the water very much like an actual frog without the fisherman maneuvering the tip of his rod to give the lure the desired effect of a swimming frog. All that is necessary is for the angler to cast the lure the desired distance and then reel in his line in a regular and uniform manner or in any other manner. The fish lure will swim through the water and appear very much in the manner of a natural frog.

The beads 12 will be provided to provide additional spacing between the legs 3 and the hooks 25, thereby making it easier to unhook fish that are caught on the hooks 25.

With the spinners 16 hooked up on the evener arrangement as disclosed, the rear legs 3 do not rotate but merely oscillate back and forth around the main rod 5 of the frame 4, thereby simulating the movements of an actual frog. A complete rotation is not usual but the exceptional behavior of the legs of the lure.

The body and legs may be made of any desired finish; however, it has been discovered that much better results are obtained by using a transparent plastic material with my novel foil 112 therein as described above.

Single, double, or triple hooks may be used with my invention and they are preferably connected by a split ring as at 28. The hooks may be used with or without the bucktail 23 to suit the individual fisherman.

In the foregoing specification, I have set forth the invention in its preferred practical forms but I am aware that the structure shown is capable of modification within a range of equivalents without departing from the invention which is to be understood is broadly novel as is commensurate with the appended claims.

The embodiments of the invention in which an exclusive property or privilege is claimed are defined as follows:

1. A fish lure comprising a wire frame having an eye formed at each end thereof, a plastic body formed on said frame at one end thereof, rear legs integrally connected together and pivotally mounted on said frame intermediate the ends of said frame behind said plastic body and adapted to swing therearound, and a spinner attached to each of said legs at the end thereof remote from said frame whereby said legs are urged to swing around said body simulating a swimming frog, said legs being pivotally attached to said frame by means of a leg support twisted around said wire frame, said legs being molded around said leg support.

2. The fish lure recited in claim 1 wherein said leg supports terminate at each end thereof in ends which are bent generally at right angles to the main parts thereof and tips which are bent at an angle to said ends thereof and a wire is twisted around said ends intermediate the main parts of the leg supports and the tips, said twisted wire having one end thereof extending outward and being bent back on itself to form a spinner receiving member.

3. The fish lure recited in claim 2 wherein the spinner receiving members are pivotally mounted on the leg supports and a bead is disposed on said wire end between said spinner receiving member and said leg wire tip.

References Cited in the file of this patent

UNITED STATES PATENTS

| | | |
|---|---|---|
| 1,295,617 | Shannon | Feb. 25, 1919 |
| 1,522,019 | Mantz | Jan. 6, 1925 |
| 1,849,434 | Page | Mar. 15, 1932 |
| 2,504,229 | Sinclair | Apr. 18, 1950 |
| 2,585,494 | Pelto | Feb. 12, 1952 |
| 2,586,141 | Angell | Feb. 19, 1952 |
| 2,611,205 | Steel | Sept. 23, 1952 |
| 2,618,096 | Wagner | Nov. 18, 1952 |